United States Patent
Hoobler et al.

(10) Patent No.: US 9,377,762 B2
(45) Date of Patent: Jun. 28, 2016

(54) DISPLAYING NOTIFICATIONS ON A WATCHFACE

(71) Applicant: MOTOROLA MOBILITY LLC, Chicago, IL (US)

(72) Inventors: Ricky J. Hoobler, Lake Bluff, IL (US); Daniel T. Jacobs, San Francisco, CA (US); Megan Knight, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 99 days.

(21) Appl. No.: 14/453,739

(22) Filed: Aug. 7, 2014

(65) Prior Publication Data

US 2015/0346694 A1    Dec. 3, 2015

Related U.S. Application Data

(60) Provisional application No. 62/006,399, filed on Jun. 2, 2014.

(51) Int. Cl.

| G04G 9/00 | (2006.01) |
|---|---|
| G04G 9/06 | (2006.01) |
| G04G 9/04 | (2006.01) |
| G04G 11/00 | (2006.01) |
| G06F 1/16 | (2006.01) |

(52) U.S. Cl.
CPC ............... G04G 9/00 (2013.01); G04G 9/0064 (2013.01); G04G 9/04 (2013.01); G04G 9/06 (2013.01); G04G 11/00 (2013.01); G06F 1/163 (2013.01)

(58) Field of Classification Search
CPC ..... G04G 9/00; G04G 9/0023; G04G 9/0082; G04G 9/02; G04G 9/0064; G04G 9/04; G04G 9/06; G04G 11/00; G06F 1/163
See application file for complete search history.

(56) References Cited

U.S. PATENT DOCUMENTS

| 4,979,155 A * | 12/1990 | Tung .................... G04B 19/082 368/223 |
|---|---|---|
| 5,297,118 A * | 3/1994 | Sakumoto ............ G04G 9/0082 340/7.55 |
| 5,455,808 A * | 10/1995 | Grupp ..................... G04G 9/06 368/228 |
| 5,892,455 A * | 4/1999 | Matsumoto ............. G09F 23/16 340/7.55 |
| 6,449,219 B1 * | 9/2002 | Hepp .................... G04G 9/0082 368/16 |
| 6,525,997 B1 * | 2/2003 | Narayanaswami .. G04G 9/0082 368/223 |
| 6,535,461 B1 * | 3/2003 | Karhu .................... G04C 3/001 368/10 |
| 6,580,664 B2 * | 6/2003 | Magnusson ............ G04G 21/04 368/223 |
| 6,714,486 B2 * | 3/2004 | Biggs ....................... G04G 9/00 368/10 |
| 6,751,164 B1 * | 6/2004 | Sekiguchi .............. G04C 3/146 368/21 |
| 7,215,601 B2 * | 5/2007 | Plancon ............... G04B 19/082 368/10 |
| 7,940,604 B2 * | 5/2011 | Inoue ..................... B60K 37/02 368/223 |
| 8,059,491 B1 * | 11/2011 | Hennings-Kampa G04G 9/0064 368/14 |
| 2003/0039174 A1* | 2/2003 | Magnusson ............ G04G 21/04 368/47 |
| 2012/0092383 A1* | 4/2012 | Hysek .................... G04G 21/08 345/684 |

* cited by examiner

Primary Examiner — Vit W Miska
(74) Attorney, Agent, or Firm — Shumaker & Sieffert, P.A.

(57) ABSTRACT

Disclosed are techniques for displaying notifications on a watchface. In one or more implementations, a watchface is displayed on a display of a smartwatch. The watchface occupies an entire display area of the display and indicates a current time in a first region of the watchface. In some cases, the watchface uses one or more rotating pointers or rotating dials to indicate the current time. Responsive to receiving a notification, the notification is displayed at a second region of the watchface such that the current time is visible in the first region of the watchface.

20 Claims, 5 Drawing Sheets

DISPLAYING NOTIFICATIONS ON A WATCHFACE

RELATED APPLICATIONS

This application claims priority to U.S. Provisional Application 62/006,399, filed on Jun. 2, 2014, which is incorporated herein by reference in its entirety.

TECHNICAL FIELD

The present disclosure is related generally to smartwatches, and more particularly to displaying a watchface and notifications on a display of the smartwatch.

BACKGROUND

Conventional smartwatches may be able to display both the current time as well as notifications corresponding to incoming text messages, upcoming calendar events, and the like. However, when these notifications are displayed they often block the current time or are too small to provide any useful information to the user.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Smartwatches can display the current time as well as notifications pertaining to events such as incoming text messages and email messages, upcoming calendar events, social-media updates, and the like. For example, a smartwatch can be wirelessly linked to a smartphone and receive updates from the smartphone when a new text message is received. A notification can then be displayed on the smartwatch to indicate that the new text message is received. In some cases, a user may then be able to read the text message on the smartwatch without taking the smartphone out of the user's pocket. In other cases, the notification may simply notify the user that the new text message is available on the user's smartphone.

In order to provide notifications, some conventional smartwatches display small notification icons on the smartwatch display. For example, a smartwatch may display a small "envelope" icon whenever a new email message is received. If more than one new email has been received, then the smartwatch may even indicate the total number of new email messages by displaying the number of new email messages proximate the envelope icon. In order to view additional information about the new email message, however, the user may either select the icon or view the new email message on the user's smartphone. Requiring a user to take a separate action to view information about a notification is inefficient for the user. For instance, in some cases the user may take a separate action to view the new email message even if the email message is unimportant to the user. However, if the user had been able to determine additional information about the email from the notification, such as the sender of the email or the subject of the email, the user may have made the decision not to take the separate action to view the email.

To remedy this inefficiency, a smartwatch may display notifications that include additional information, such as the sender and the subject of an email message. In order to do so, however, a size of the notification may be increased which may block the current time displayed on the smartwatch display. This can be inconvenient and frustrating to the user. For example, if the user wishes to view the current time on the smartwatch, the user may be unable to quickly do so if a notification is blocking the display of the current time. In these cases, the user must first perform an extra action to remove the notification from the display so that the current time is viewable.

This disclosure describes techniques and apparatuses for displaying notifications on a watchface. In one or more implementations, a smartwatch displays a digital representation of a watchface that occupies the entire display area of the smartwatch. However, the watchface is configured such that the current time is always displayed in a first region of the watchface. In one or more implementations, the watchface includes one or more rotating pointers or rotating dials, and thus can be distinguished from a conventional digital watch that displays the time as a series of digits.

When a notification is received, the smartwatch displays the notification at a second region of the watchface such that the current time is still visible in the first region of the watchface. Thus, unlike conventional watchfaces, the watchfaces described herein enable the user to concurrently view the current time as well as any notifications.

Further, as will be discussed in more detail below, a display area of the notification is large relative to the display area of the watchface. For example, in some cases the display area of the notification may be approximately half of the total display area of the display. This enables the smartwatch to display additional information with the notification. For instance, the notification may include at least two pieces of information associated with the notification, such as a sender and a subject of an email message. This additional information enables the user to quickly and efficiently make decisions regarding the notification without the need to perform extra actions.

Figure 1:
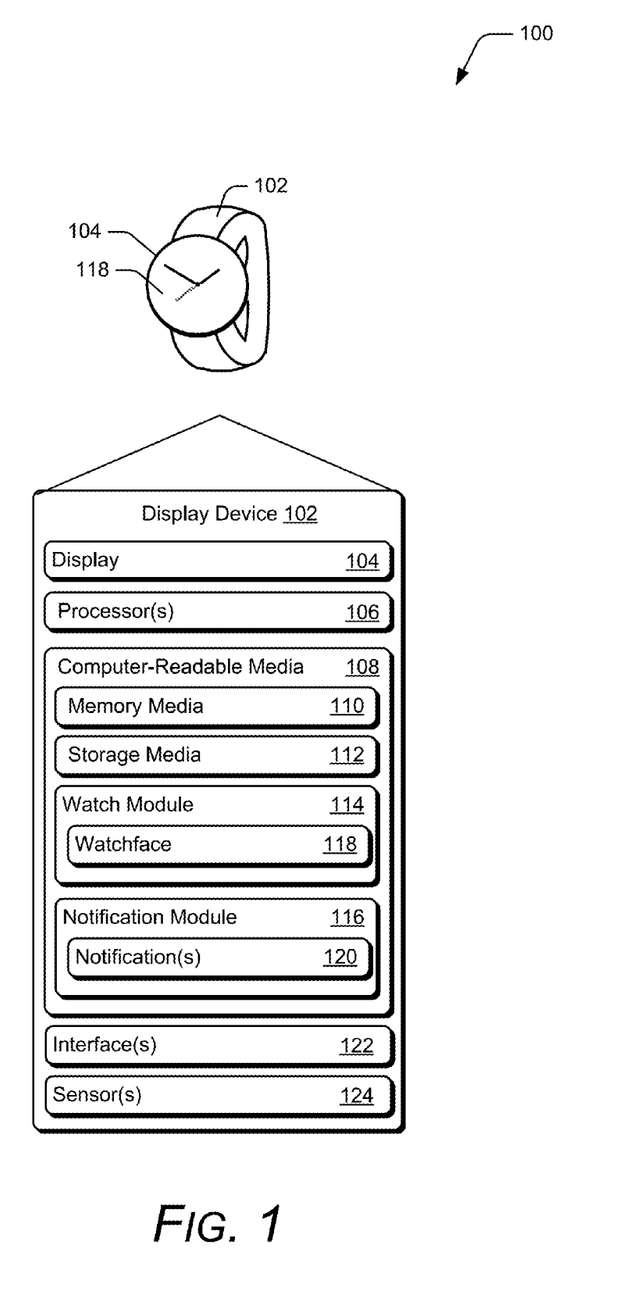
FIG. 1 is an overview of a representative environment in which the present techniques may be practiced.

FIG. 1 is an overview of a representative environment 100 in which the present techniques may be practiced. Environment 100 includes a smartwatch 102 that includes a display 104. It is to be appreciated, however, that the techniques described herein may be implemented by any device with a display, such as wearable devices (e.g., a smart bracelet, a smart ring, or smart glasses), a mobile phone, a notebook computer (e.g., netbook or ultrabook), a camera, a tablet computer, a personal media player, a personal navigating device (e.g., global positioning system), a gaming console, a desktop computer, a video camera, or a portable gaming device.

In environment 100, display 104 is implemented as a circular display that can be controlled to render or display information and images for viewing. It is to be appreciated, however, that other shapes of displays may also be used, such as square, rectangular, triangular, and the like. Display 104 may be implemented as a liquid-crystal display or any other type of flat-panel display. In addition, display 104 may include a touchscreen that enables a user to control display 104 by touching or tapping display 104.

Smartwatch 102 includes processors 106 and computer-readable media 108, which includes memory media 110 and storage media 112. Applications and an operating system (not shown) embodied as computer-readable instructions on computer-readable media 108 can be executed by processors 106 to provide some or all of the functionalities described herein. Computer-readable media 108 also includes a watch module 114 and a notification module 116.

Watch module 114 is configured to render a watchface 118 on display 104 that indicates a current time. In one or more implementations, watchface 118 uses one or more rotating pointers or dials to display the current time. For example, watchface 118 may be implemented as an analog watchface that displays the time using one or more rotating pointers or hands that point to numbers arranged on a stationary dial. Alternately, watchface 118 may be implemented as a rotating watchface that displays the time using rotating hour and minute dials and a stationary viewfinder that highlights the current time on the rotating dials. Thus, watchface 118 may be distinguished from a conventional digital watch that displays the time as a series of digits, such as "4:17". Examples of an analog watchface and a rotating watchface are described in more detail below with regards to FIGS. 2 and 3, respectively.

Notification module 116 is configured to cause display of notifications 120 on display 104. Notifications 120 may include, by way of example and not limitation, email-message notifications, text-message notifications, social-media notifications, weather notifications, flight notifications, and calendar notifications.

In one or more implementations, watchface 118 occupies the entire display area of display 104. Thus, notifications 120 rendered on display 104 overlap at least a portion of watchface 118. Notifications 120 may be opaque such that the region of watchface 118 at which notifications 120 are displayed is not visible. However, as described in more detail below, watchface 118 is designed such that the current time is always visible on watchface 118 even when notifications 120 are displayed on display 104.

Smartwatch 102 may also include interfaces 122 that enable wired or wireless communication of data. Interfaces 122 can include wireless personal-area-network ("WPAN") radios compliant with various WPAN standards, such as Institute of Electrical and Electronics Engineers ("IEEE") 802.15 standards, infrared data association standards, or wireless Universal Serial Bus ("USB") standards, to name just a few. Interfaces 122 can also include, by way of example and not limitation, wireless local-area-network ("WLAN") radios compliant with any of the various IEEE 802.11 standards, wireless-wide-area-network ("WWAN") radios for cellular telephony, wireless-metropolitan-area-network ("WMAN") radios compliant with various IEEE 802.15 standards, and wired Ethernet transceivers.

Interfaces 122 enable smartwatch 102 to interface with other computing devices associated with a user of smartwatch 102. Notification module 116 may receive notifications 120 from these other computing devices. For example, a text message may be received by the user's smartphone over a wireless network. The text message may then be transmitted to the user's smartwatch 102. Upon receipt of the text message, smartwatch 102 can generate notification 120 regarding the text message.

Smartwatch 102 may also include one or more sensors 124 that are configured to receive sensor data, such as sensor data corresponding to movement. Sensors 124 can include an accelerometer sensor configured to receive accelerometer data, a global positioning system ("GPS") sensor configured to receive GPS data, or any other type of sensor configured to sense movement. Sensors 124 may enable the user to perform gestures to interact with notifications 120. For example, when a notification 120 is displayed on smartwatch 102, the user may be able to rotate his wrist or wave his hand in order to view additional information associated with notification 120. Alternately or additionally, the user may be able to touch or tap the touchscreen of display 104 to view additional information associated with notification 120.

Smartwatch 102 can also be implemented with any number and combination of differing components as further described with reference to the example device shown in FIG. 5.

Figure 2A:
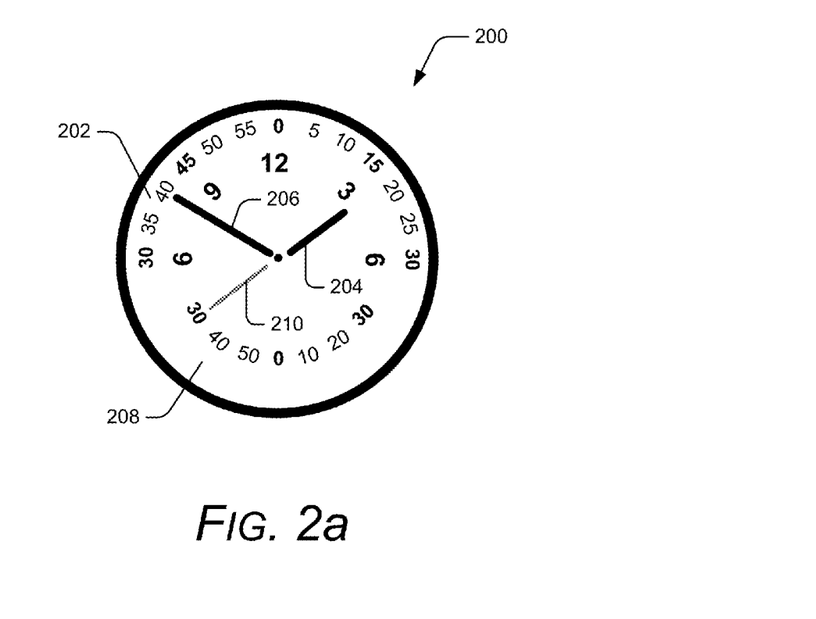
FIG. 2A is an example of an analog watchface in accordance with one or more implementations.

FIG. 2A is an example of an analog watchface 200 in accordance with one or more implementations. In this example, watch module 114 causes display of analog watchface 200 on display 104 of smartwatch 102.

Analog watchface 200 occupies an entire display area of display 104 and is designed so that a current time is always displayed in a top region of analog watchface 200. In this example the current time is "3:40". The top region of analog watchface 200 includes a stationary dial 202, an hour pointer 204, and a minute pointer 206. Watch module 114 controls hour pointer 204 to rotate to point to hours arranged on stationary dial 202 to indicate an hour of the current time. Similarly, watch module 114 controls minute pointer 206 to point to minutes arranged on stationary dial 202 to indicate a minute of the current time.

While stationary dial 202, hour pointer 204, and minute pointer 206 are depicted in the top region of watchface 200, it is to be appreciated that other arrangements are contemplated. For instance, in some cases analog watchface 200 may display the current time in a bottom, left, or right region of analog watchface 200 by positioning stationary dial 202, hour pointer 204, and minute pointer 206 in the bottom, left, or right region of analog watchface 200.

In this example, analog watchface 200 also includes an additional stationary dial 208 and a second pointer 210 in a bottom region of analog watchface 200. Watch module 114 controls second pointer 210 to rotate to point to seconds arranged on the additional stationary dial 208 to indicate seconds of the current time. However, in some implementations analog watchface 200 may not include additional stationary dial 208 and second pointer 210.

In contrast to a conventional mechanical analog watchface that includes a 360-degree dial that wraps around the entire perimeter of the watchface, stationary dial 202 is a 180-degree dial and wraps around the top perimeter of analog watchface 200. In this example, the hours displayed on stationary dial 202 range from 6 to 6, and the minutes range from 30 to 30. Thus, analog watchface 200 is able to display a range of 12 hours, just like a conventional mechanical analog watchface with a 360-degree dial. Similarly, analog watchface 200 is able to display a range of 60 minutes, just like a conventional analog watchface with a 360-degree dial. Note that other arrangements of hours and minutes on stationary dial 202 are contemplated. For example, in some implementations the hours may range from 0 to 12 on stationary dial 202 and the minutes may range from 0 to 60 on stationary dial 202.

Figure 2B:
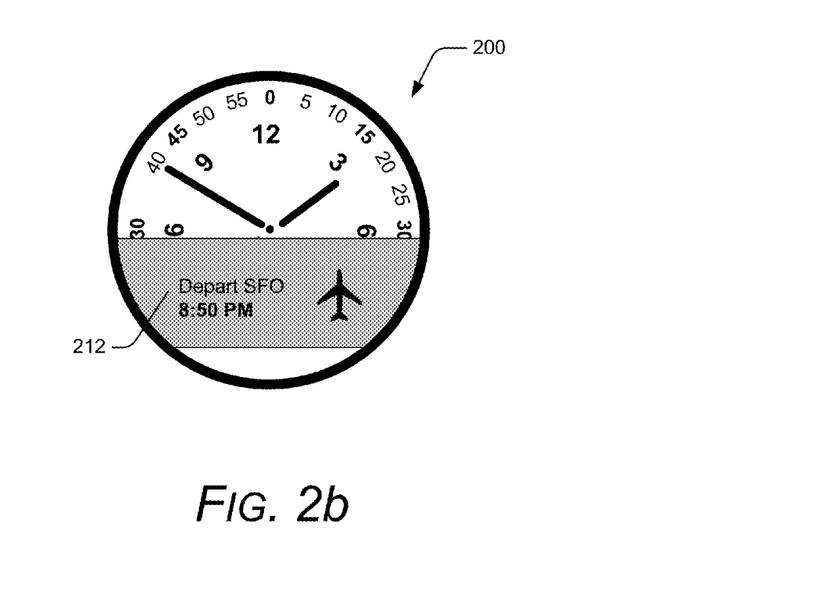
FIG. 2B is an example of the analog watchface when displaying a notification in accordance with one or more implementations.

FIG. 2B is an example of analog watchface 200 when displaying a notification in accordance with one or more implementations. In this example, notification module 116 causes display of a notification 212 in a bottom region of analog watchface 200. Notification 212 corresponds to a flight notification regarding an upcoming flight for the user. As discussed throughout, however, notification 212 may correspond to any type of notification.

Notification 212 is opaque and thus blocks display of the second region of watchface 200. Note, therefore, that if a conventional analog watchface were utilized by smartwatch 102, notification 212 would often prevent the user from determining the current time. For example, if notification 212 were displayed in the bottom region of a conventional analog watchface with a 360-degree dial, then the user would be unable to determine the current time at a time of 6:35 because both the hour pointer and the minute pointer would be blocked by notification 212.

In analog watchface 200, however, the current time is always visible even when notification 212 is displayed. This is possible because the current time is always displayed in the top region of analog watchface 200, and notification 212 is always displayed in the bottom region of analog watchface 200. While notification 212 blocks the bottom region of analog watchface 200, it is to be appreciated that the bottom region of analog watchface 200 is not needed to determine hours and minutes of the current time.

Note that the display area of notification 212 is large relative to the display area of display 104. For instance, notification 212 takes up approximately half of the total display area of display 104. As displays for smartwatches are small relative to other types of devices, the large relative size of notification 212 enables more information to be displayed to the user than notifications displayed on conventional smartwatches.

For example, notification 212 indicates a departure airport ("SFO") and a departure time ("8:50 PM"), as well as a plane indicator that indicates that notification 212 corresponds to flight information. Displaying more information to the user enables more efficient interaction by the user with notification 212. For example, by glancing at notification 212, the user is able to determine that his flight is scheduled to depart at 8:50 PM. As such, the user does not have to take a separate action to check the departure time.

Figure 3A:
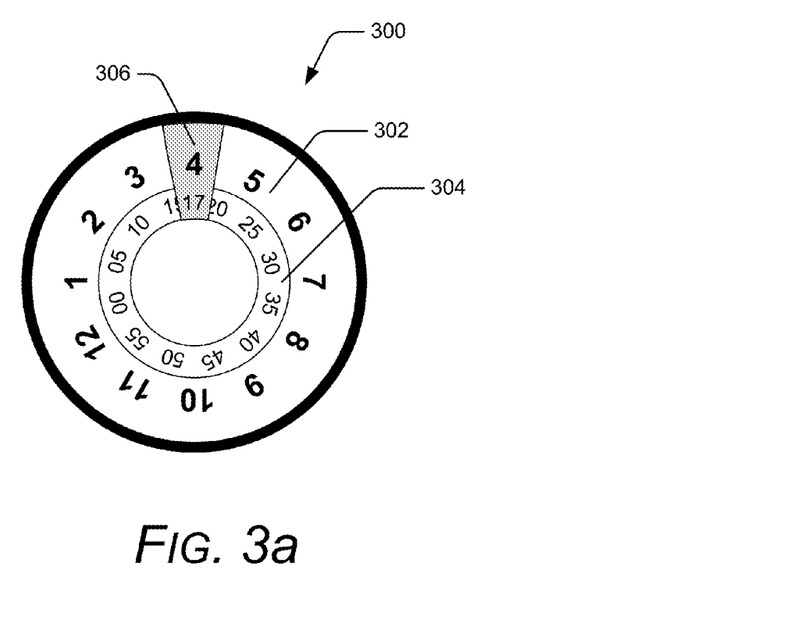
FIG. 3A is an example of a rotating watchface in accordance with one or more implementations.

FIG. 3A is an example of a rotating watchface 300 in accordance with one or more implementations. In this example, watch module 114 causes display of rotating watchface 300 on display 104 of smartwatch 102.

Rotating watchface 300 occupies the entire display area of display 104 and is designed so that a current time is always displayed in a top region of rotating watchface 300. In this example the current time is "4:17". Rotating watchface 300 includes a rotating hour dial 302, a rotating minute dial 304, and a viewfinder 306. In this example, rotating hour dial 302 displays hours in the range of 1 to 12. In one or more implementations, however, watch module 114 may implement a "24-hour mode" in which rotating hour dial 302 displays hours in the range of 1 to 12, and then transitions to displaying hours in the range of 13 to 24.

Watch module 114 controls rotating hour dial 302 and rotating minute dial 304 to rotate counter-clockwise around rotating watchface 300. For example, as each minute passes, watch module 114 controls rotating minute dial 304 to rotate one unit counter-clockwise, and as each hour passes, watch module 114 controls rotating hour dial 302 to rotate one unit counter clockwise.

Viewfinder 306 highlights or indicates an hour and a minute on rotating hour dial 302 and rotating minute dial 304, respectively, corresponding to the current time. In FIG. 3A, for example, viewfinder 306 highlights hour "4" on rotating hour dial 302 and minute "17" on rotating minute dial 304, which indicates the current time of "4:17". Note, in this example, that 17 is highlighted even though rotating minute dial 304 displays every fifth minute (e.g., 5, 10, 15, 20). Rotating watchface 300 modifies the displayed minutes in viewfinder 306 in order to provide a more accurate representation of the current time. It is to be appreciated, however, that other ways to display each minute are contemplated. In some cases, for example, a series of four dots may be placed between each multiple of 5 minutes on the minute dial, and viewfinder 306 may highlight the dot corresponding to the minute of the current time.

Note that viewfinder 306 is positioned in a top region of rotating watchface 300. Thus, rotating watchface 300 always will display the current time in the top region of rotating watchface 300, which enables notifications to be displayed in the bottom region of rotating watchface 300 without blocking the current time. It is to be appreciated, however, that other arrangements are contemplated. For instance, in some cases viewfinder 306 may be positioned in a bottom, left, or right region of rotating watchface 300, and notifications may then be displayed in a top, right, or left region, respectively, of rotating watchface 300.

Figure 3B:
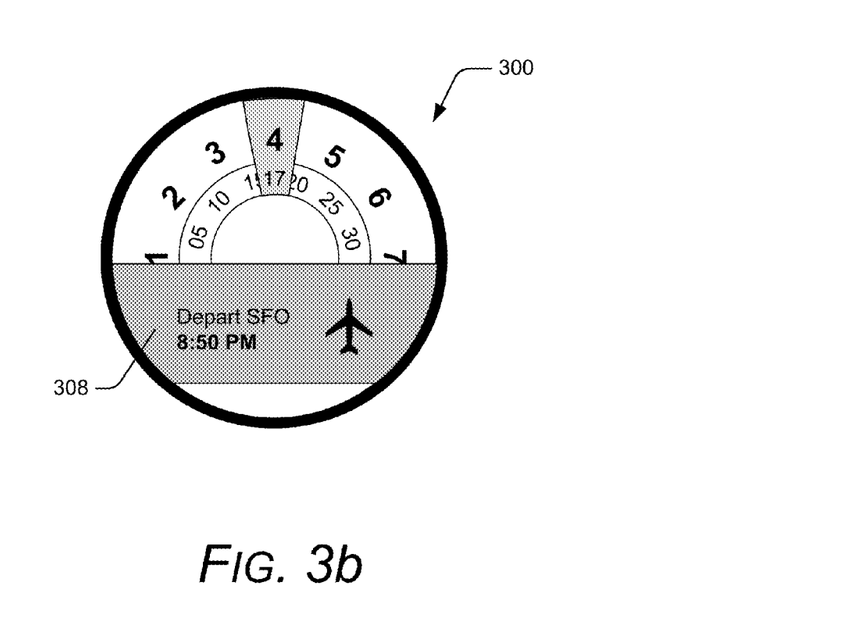
FIG. 3B is an example of the rotating watchface when displaying a notification in accordance with one or more implementations.

FIG. 3B is an example of rotating watchface 300 when displaying a notification in accordance with one or more implementations. In FIG. 3B, notification module 116 causes display of a notification 308 in the bottom region of watchface 300. Similar to notification 212 in FIG. 2B, notification 308 corresponds to a flight notification regarding an upcoming flight for the user.

In rotating watchface 300, the current time is always visible even when notification 308 is displayed. This is possible because the current time is always indicated by viewfinder 306 which is positioned in the top region of rotating watchface 300, and notification 308 is always displayed in the bottom region of rotating watchface 300. Notably, notification 308 is opaque and thus blocks the bottom region of rotating watchface 300. However, the portions of rotating hour dial 302 and rotating minute dial 304 blocked by notification 308 are not needed to determine the current time.

Similar to notification 212, the display area of notification 308 is large relative to the display area of rotating watchface 300 on display 104. For instance, notification 308 takes up approximately half of the total display area of rotating watchface 300 on display 104. As displays for smartwatches are small relative to other types of devices, the large relative size of notification 308 enables more information to be displayed to the user than notifications displayed on conventional smartwatches.

For example, notification 308 indicates a departure airport ("SFO") and a departure time ("8:50 PM"), as well as a plane indicator that indicates that the notification corresponds to flight information. Displaying more information to the user enables more efficient interaction by the user with notification 308. For example, by glancing at notification 308, the user is able to determine that his flight is scheduled to depart at 8:50 PM, and thus the user does not have to take a separate action to check the departure time.

Analog watchface 200 and rotating watchface 300, described above, are examples of watchfaces that can be used to display a current time and a notification on a watchface. It is to be appreciated, however, that other types of watchfaces and notifications are contemplated that enable the display of a current time in a first region of a watchface and the display of notifications in a second region of the watchface such that the current time is always visible.

Note that in each of the examples described above, the current time is always displayed in watchface 118, and thus watch module 114 does not need to move, morph, or resize watchface 118 in order to display notification 120. However, in one or more implementations, watchface 118 may be moved or morphed in order to make room for notification 120. For example, a conventional analog watchface that takes up the entire display area may be displayed on display 104 of display device 102. When notification 120 is received, watch module 114 may cause watchface 118 to be moved to make room for notification 120. For example, notification 120 may be displayed in the bottom region of display 104, and watchface 118 may be displayed in the top region of display 104 such that the current time is visible in the top region of display 104. However, in order to make the current time visible on watchface 118 in the top region, watch module 114 may morph or resize watchface 118. For example, in some cases, the size of watchface 118 can be reduced such that the entire analog watchface fits into the top region of display 104. Alternately, watch module 114 may morph watchface 118 such that it resembles the analog watchface 200 described in FIGS. 2A and 2B or such that it resembles the rotating watchface 300 described in FIGS. 3A and 3B.

The following discussion describes techniques for displaying notifications on a watchface. These techniques can be implemented using the previously described watchfaces, such as analog watchface 200 of FIGS. 2A and 2B or rotating watchface 300 of FIGS. 3A and 3B. These techniques include the example method illustrated in FIG. 4, which is shown as operations performed by one or more entities. The order in which operation of this method is shown or described is not intended to be construed as a limitation, and any number or combination of the described method operations can be combined in any order to implement a method, or an alternate, including that illustrated by FIG. 4.

Figure 4:
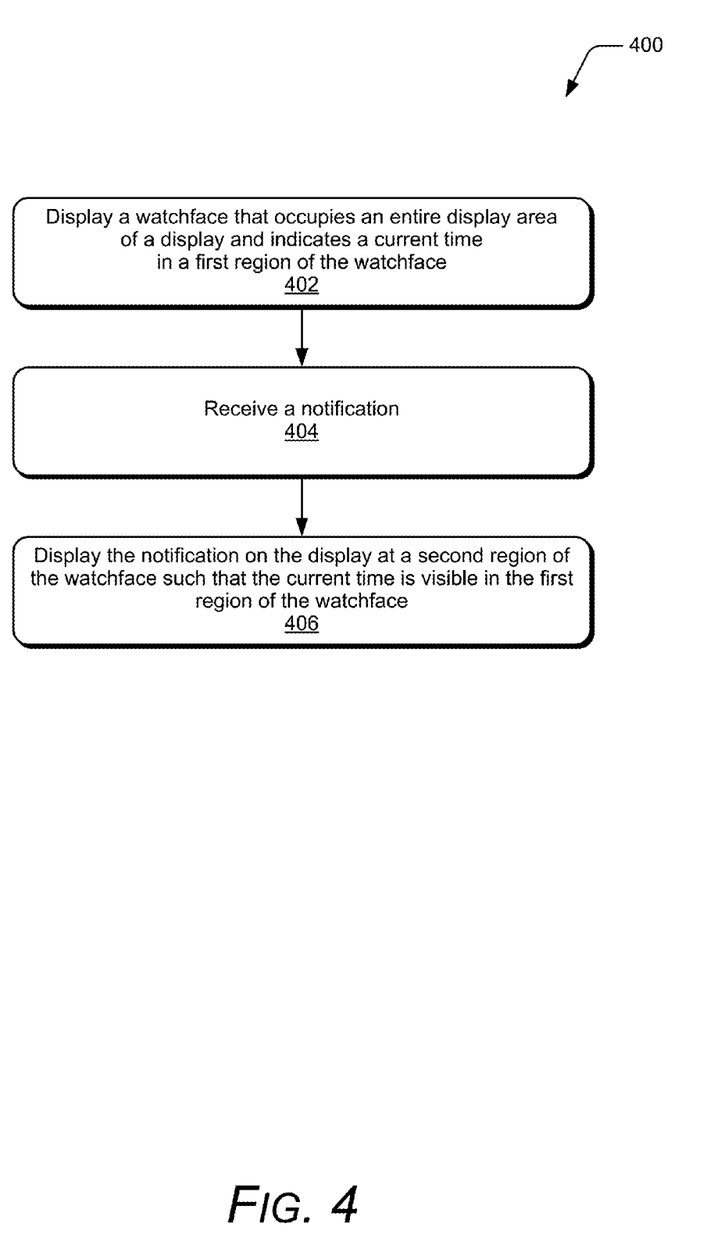
FIG. 4 is a flowchart of a representative method for displaying notifications on a watchface.

FIG. 4 is a flowchart of a representative method for displaying notifications on a watchface.

At 402, a watchface is displayed that occupies an entire display area of a display of a smartwatch and indicates a current time in a first region of the watchface. For example, watch module 114 causes display of analog watchface 200 that occupies an entire display area of display 104 of smartwatch 102 and indicates a current time in a top region of the watchface. As another example, watch module 114 causes display of rotating watchface 300 that occupies an entire display area of display 104 of smartwatch 102 and indicates a current time in a top region of the watchface.

At 404, a notification is received. For example, notification module 116 may receive a notification via interface 122. The notification may correspond to any type of notification, such as a text-message notification, a social-media notification, a weather notification, a flight notification, a calendar notification, and so on. In some cases, the notification can be received from a computing device that is wirelessly coupled to smartwatch 102. For example, a smartwatch worn by a user can receive notifications from the user's smartphone that is wirelessly coupled to the smartwatch.

At 406, the notification is displayed on the display at a second region of the watchface such that the current time is visible in the first region of the watchface. For example, notification module 116 causes display of notification 212 on display 104 of smartwatch 102 at a bottom region of analog watchface 200 such that the current time is visible in the top region of analog watchface 200. As another example, notification module 116 causes display of notification 308 on display 104 of smartwatch 102 at a bottom region of rotating watchface 300 such that the current time is visible in the top region of rotating watchface 300.

Figure 5:
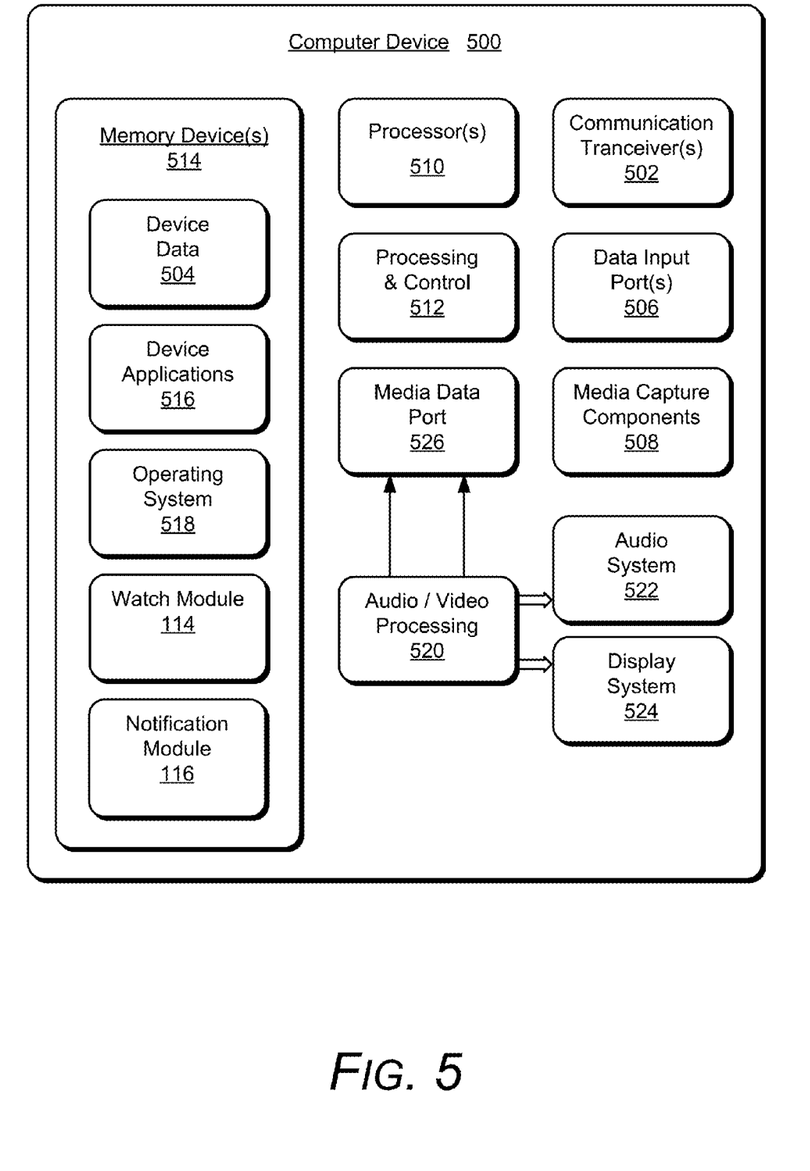
FIG. 5 illustrates various components of an example electronic device that can implement the present techniques.

FIG. 5 illustrates various components of an example electronic device 500 that can implement the present techniques. For example, the electronic device 500 may be implemented as any type of smartwatch, such as smartwatch 102 of FIG. 1.

The electronic device 500 includes communication transceivers 502 that enable wired and wireless communication of device data 504, such as received data, data that are being received, data scheduled for broadcast, data packets of the data, etc. Example communication transceivers 502 include WPAN radios compliant with various IEEE 802.15 standards, WLAN radios compliant with any of the various IEEE 802.11 standards, WWAN radios for cellular telephony, WMAN radios compliant with various IEEE 802.16 standards, and wired Ethernet transceivers.

The electronic device 500 may also include one or more data input ports 506 via which any type of data, media content, or inputs can be received, such as user-selectable inputs, messages, music, television content, recorded video content, and any other type of audio, video, or image data received from any content or data source. The data input ports may include USB ports, coaxial cable ports, and other serial or parallel connectors (including internal connectors) for flash memory, digital versatile disks ("DVDs"), compact disks, and the like. These data input ports may be used to couple the electronic device 500 to components, peripherals, or accessories such as microphones or cameras. Additionally, the electronic device 500 may include media-capture components 508, such as an integrated microphone to capture audio and a camera to capture still images or video media content.

The electronic device 500 includes one or more processors 510 (e.g., any of microprocessors, controllers, and the like), which process computer-executable instructions to control operation of the device. Alternatively or in addition, the electronic device can be implemented with any one or combination of software, hardware, firmware, or fixed-logic circuitry that is implemented in connection with processing and control circuits, which are generally identified at 512. Although not shown, the electronic device 500 can include a system bus or data transfer system that couples the various components within the device. A system bus can include any one or combination of different bus structures, such as a memory bus or memory controller, a peripheral bus, a universal serial bus, or a processor or local bus that utilizes any of a variety of bus architectures.

The electronic device 500 also includes one or more memory devices 514 that enable data storage, examples of which include random-access memory, non-volatile memory (e.g., read-only memory, flash memory, etc.), and a disk storage device. A disk storage device may be implemented as any type of magnetic or optical storage device, such as a hard disk drive, a recordable or rewriteable disc, any type of DVD, and the like. The electronic device 500 may also include a mass storage media device.

A memory device 514 provides data storage mechanisms to store the device data 504, other types of information or data, and various device applications 516 (e.g., software applications). For example, an operating system 518 can be maintained as software instructions within a memory device and executed on the processors 510. The device applications may also include a device manager, such as any form of a control application, software application, signal-processing and control module, code that is native to a particular device, a hardware abstraction layer for a particular device, and so on. In some implementations, the electronic device also includes watch module 114 and notification module 116 of FIG. 1.

The electronic device 500 also includes an audio and video processing system 520 that generates audio data for an audio system 522 and generates display data for a display system 524. The audio system or the display system may include any devices that process, display, or otherwise render audio, video, display, or image data. Display data and audio signals can be communicated to an audio component or to a display component via a radio-frequency link, S-video link, high-definition multimedia interface, composite video link, component video link, digital video interface, analog audio connection, or other similar communication link, such as media data port 526. Additionally, the audio system or the display system may be external components to the electronic device, or alternatively, may be integrated components of the example electronic device.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   outputting, by a computing device and for display at a display device, a watchface that occupies an entire display area of the display device and indicates a current time in a first region of the watchface, wherein the watchface comprises a plurality of numerals, wherein each numeral is indicative of a respective hour, minute, or second, wherein a first subset of the plurality of numerals is output for display at the first region of the watchface and a second subset of the plurality of numerals is output for display at a second region of the watchface, and wherein while outputting the watchface for display, the computing device always outputs the current time at the first region of the watchface;
   receiving, by the computing device, a notification; and
   responsive to receiving the notification, outputting, by the computing device and for display at the display device, the current time at the first region of the watchface and the notification at the second region of the watchface such that the current time is indicated in the first region of the watchface and the second subset of the plurality of numerals is no longer output for display at the second region of the watchface.

2. The method of claim 1, wherein outputting the watchface comprises outputting, by the computing device and for display at the display device, one or more rotating pointers or rotating dials to indicate the current time.

3. The method of claim 1, wherein outputting the notification comprises outputting, by the computing device and for display at the display device, an opaque notification, such that the second subset of the plurality of numerals is no longer output for display at the second region of the watchface.

4. The method of claim 1, wherein outputting the notification comprises outputting, by the computing device and for display at the display device, the notification at approximately half of the display area of the display device.

5. The method of claim 1, wherein outputting the notification comprises outputting, by the computing device and for display at the display device, at least two pieces of notification information.

6. The method of claim 1, wherein the first region of the watchface comprises a top region of the watchface, and wherein the second region of the watchface comprises a bottom region of the watchface.

7. The method of claim 1 wherein outputting the watchface comprises outputting, by the computing device and for display by the display device, an analog watchface.

8. The method of claim 7, wherein outputting the analog watchface comprises outputting, by the computing device, at the first region of the analog watchface:
   a stationary dial;
   an hour pointer configured to rotate to point to hours arranged on the stationary dial to indicate an hour of the current time; and
   a minute pointer configured to rotate to point to minutes arranged on the stationary dial to indicate a minute of the current time.

9. The method of claim wherein outputting the analog watchface further comprises outputting by the computing device, at the second region of the analog watchface:
   an additional stationary dial; and
   a second pointer configured to rotate to point to seconds arranged on the additional stationary dial to indicate seconds of the current time.

10. The method of claim wherein the watchface comprises outputting, by the computing device, a rotating watchface that comprises:
   a rotating hour dial configured to rotate around a perimeter of the rotating watchface;
   a rotating minute dial configured to rotate around the perimeter of the rotating watchface; and
   a viewfinder, in the first region of the rotating watchface, configured to indicate an hour on the hour dial corresponding to the current time and to indicate a minute on the minute dial corresponding to the current time.

11. The method claim 1, wherein the notification comprises one of a text message notification, a social-media notification, a weather notification, a flight notification, or a calendar notification.

12. A computing device comprising:
   a display device;
   at least one processor; and
   at least a memory comprising instructions that, when executed by the at least one processor, cause the at least one processor to:
      output, for display at the display device, a watchface that occupies an entire display area of the display device and indicates a current time in a first region of the watchface, wherein the watchface comprises a plurality of numerals, wherein each numeral is indicative of a respective hour, minute, or second, wherein a first subset of the plurality of numerals is output for display at the first region of the watchface and a second subset of the plurality of numerals is output for display at a second region of the watchface, and wherein the computing device always outputs the current time at the first region of the watchface when outputting the watchface; and receive a notification; and responsive to receiving the notification, outputting, by the computing device and for display at the display device, the current time at the first region of the watchface and the notification at the second region of the watchface such that the current time is indicated in the first region of the watchface and the second subset of the plurality of numerals is no longer output for display at the second region of the watchface.

13. The computing device of claim 12, wherein the watchface comprises one or more rotating pointers or rotating dials that indicate the current time.

14. The computing device of claim 12, wherein each of the first region and the second region occupy approximately half of the display area of the display device.

15. The computing device of claim 12, wherein the notification comprises at least two pieces of notification information.

16. The computing device of claim 12, wherein the watchface comprises an analog watchface.

17. The computing device of claim 16, wherein the first region of the analog watchface comprises:

a stationary dial;

an hour pointer configured to rotate to point to hours arranged on the stationary dial to indicate an hour of the current time; and a minute pointer configured to rotate to point to minutes arranged on the stationary dial to indicate a minute of the current time.

18. The computing device of claim 17, wherein the second region of the analog watchface comprises:

an additional stationary dial; and a second pointer configured to rotate to point to seconds arranged on the additional stationary dial to indicate seconds of the current time.

19. The computing device of claim 12, wherein the watchface comprises a rotating watchface.

20. The computing device of claim 19, wherein the rotating watchface comprises:

a rotating hour dial configured to rotate around a perimeter of the rotating watchface;

a rotating minute dial configured to rotate around the perimeter of the rotating watchface; and a viewfinder, in the first region of the rotating watchface, configured to indicate an hour on the hour dial corresponding to the current time and to indicate a minute on the minute dial corresponding to the current time.

* * * * *